United States Patent [19]

Maus et al.

[11] Patent Number: 4,965,028

[45] Date of Patent: Oct. 23, 1990

[54] METHOD OF INJECTION MOLDING THERMOPLASTIC THROUGH MULTIPLE GATES

[75] Inventors: Steven M. Maus, Osseo; George J. Galic, Columbia Heights, both of Minn.

[73] Assignee: Galic/Maus Ventures, Columbia Heights, Minn.

[21] Appl. No.: 352,700

[22] Filed: May 10, 1989

Related U.S. Application Data

[63] Continuation of Ser. No. 93,355, Sep. 4, 1987, abandoned.

[51] Int. Cl.$^5$ .............................................. B29C 45/22
[52] U.S. Cl. ................................ 264/297.2; 264/328.7; 264/328.8; 264/328.15
[58] Field of Search ............... 264/297.2, 328.1, 328.7, 264/328.8, 328.9, 328.14, 328.15, 328.16, 328.17; 425/200, 197, 199, 206

[56] References Cited

U.S. PATENT DOCUMENTS

| | | |
|---|---|---|
| 3,940,465 | 2/1976 | Hauser et al. ........................ 425/150 |
| 3,953,002 | 4/1976 | England, Jr. et al. ............... 366/322 |
| 4,008,031 | 2/1977 | Weber .................................. 425/808 |
| 4,027,857 | 6/1977 | Cunningham ....................... 366/340 |
| 4,054,273 | 10/1977 | Neuman ................................ 366/69 |
| 4,097,216 | 6/1978 | Putkowski .......................... 425/568 |
| 4,212,624 | 7/1980 | Ando et al. ......................... 425/548 |
| 4,256,584 | 3/1981 | Lord et al. .......................... 210/446 |
| 4,280,908 | 7/1981 | Lord et al. .......................... 210/446 |
| 4,285,660 | 8/1981 | Mueller ............................... 425/549 |
| 4,298,332 | 11/1981 | Aoki .................................... 425/570 |
| 4,340,156 | 7/1982 | Muller ................................. 222/146 |
| 4,364,878 | 12/1982 | Laliberte et al. ................... 425/808 |
| 4,412,805 | 11/1983 | Morrison ............................. 425/810 |
| 4,434,053 | 2/1984 | Osuna-Diaz ....................... 210/446 |
| 4,478,516 | 10/1984 | Kessler ................................. 366/87 |
| 4,591,274 | 5/1986 | Sulin .................................... 366/336 |
| 4,609,341 | 9/1986 | Muller .................................. 425/547 |
| 4,670,203 | 6/1987 | Chang ................................. 264/40.6 |

OTHER PUBLICATIONS

Injection Molds and Molding, Chapter 13, "Runnerless Molding," pp. 209–226.
"Hot Runner Molding: A System for Every Need," Plastics Equipment and Machinery, Oct. 1985, pp. 30–34.
"Molders Warm Up to Hot Runner Molds," Plastics World, Jun. 1986, pp. 40–45.
EMI "Linear Edge" Filter (Jackson Center, OH).
"A Report on the Mixing Efficiency of Static Mixing Units in Laminar Flow", presented by 73rd Annual AICHE Meeting, 10-20-80, by P. T. Allocca of Koch.
"Mixing Efficiency of Static Mixing Units in Laminar Flow," P. T. Allocca, Fiber Producer, Apr. 1982.
"Thermoplastic Processing with SMX Static Mixer", European Plastic News, Mar. 1984.
English Translation of Anleitung fur de Bau von Spritzgiesswekezeugen, 2nd Ed., 1983, by George Menges & Paul Mohren, pp. 334–335.

*Primary Examiner*—Jill L. Heitbrink

[57] ABSTRACT

A method and apparatus for thermoplastic multigated single cavity or multicavity injection molding. A plasticated melt flows along a melt distributing passageway (3), (15), (8), and enters through a plurality of gates (35) associated with and enters through a plurality of gates (35) associated with one or more mold cavity (18). Melt temperature is maintained by means of manifold heaters (26), bushing heater band (20) and, most preferably, heated probe (16). A unique melt conditioning element placed just upstream of gate (35) forces the melt to enter a plurality of inlet melt channels (51) and flow through a region of constricted cross section and/or angular change of flow direction formed by the geometric relationship of a bushing wall (13) to said element. The result is to provide, by design, various degrees of melt heating, melt filtration, and melt homogenization.

7 Claims, 10 Drawing Sheets

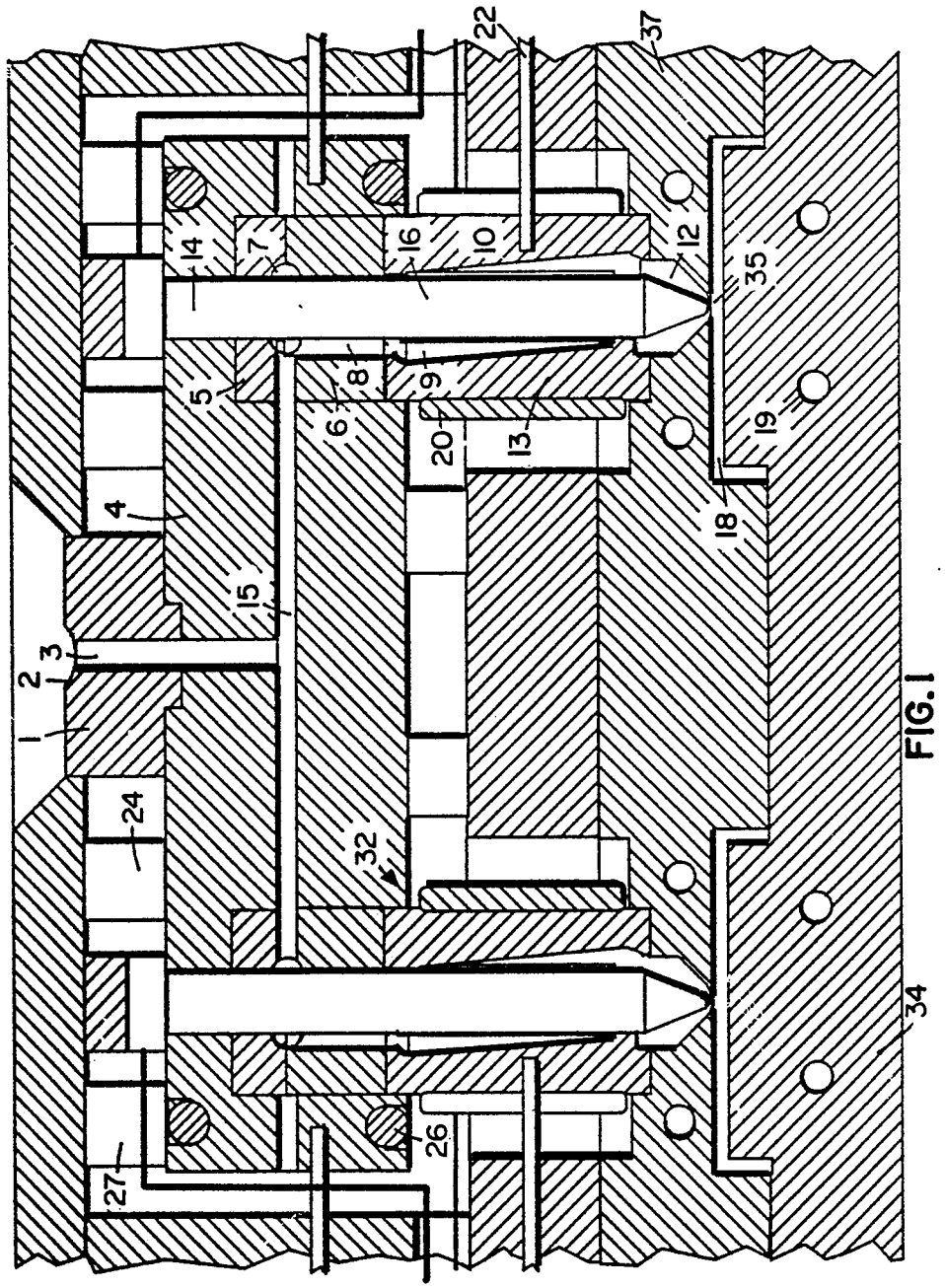

FIG. 2A-AA

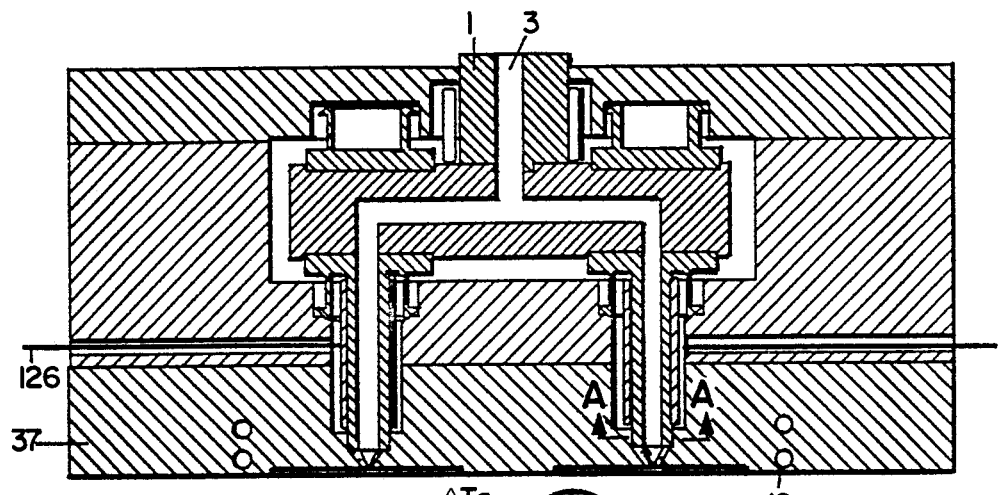
FIG. 2C
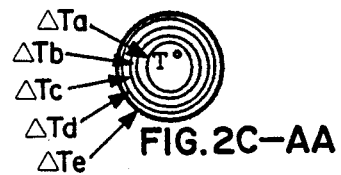
FIG. 2C-AA
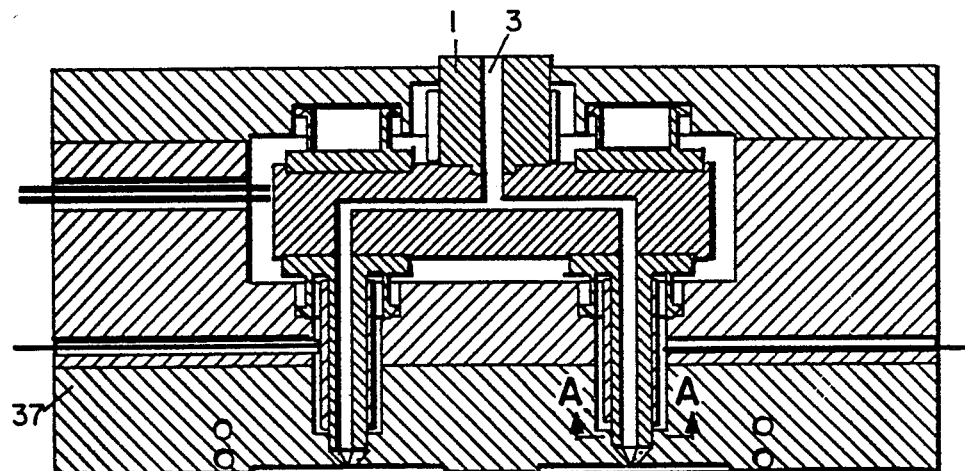
FIG. 2D
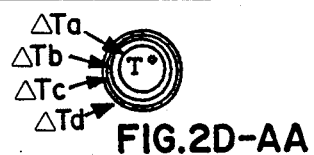
FIG. 2D-AA

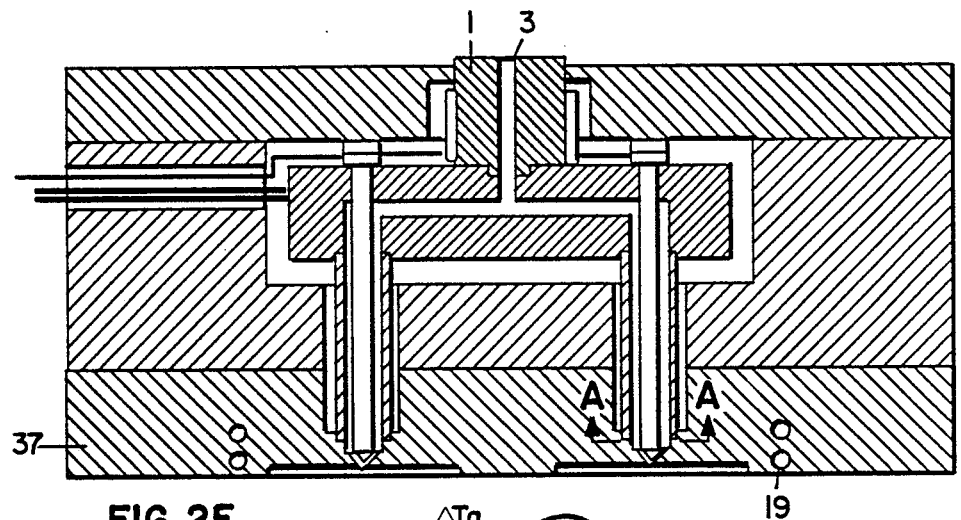
FIG. 2E
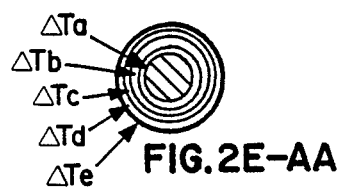
FIG. 2E-AA

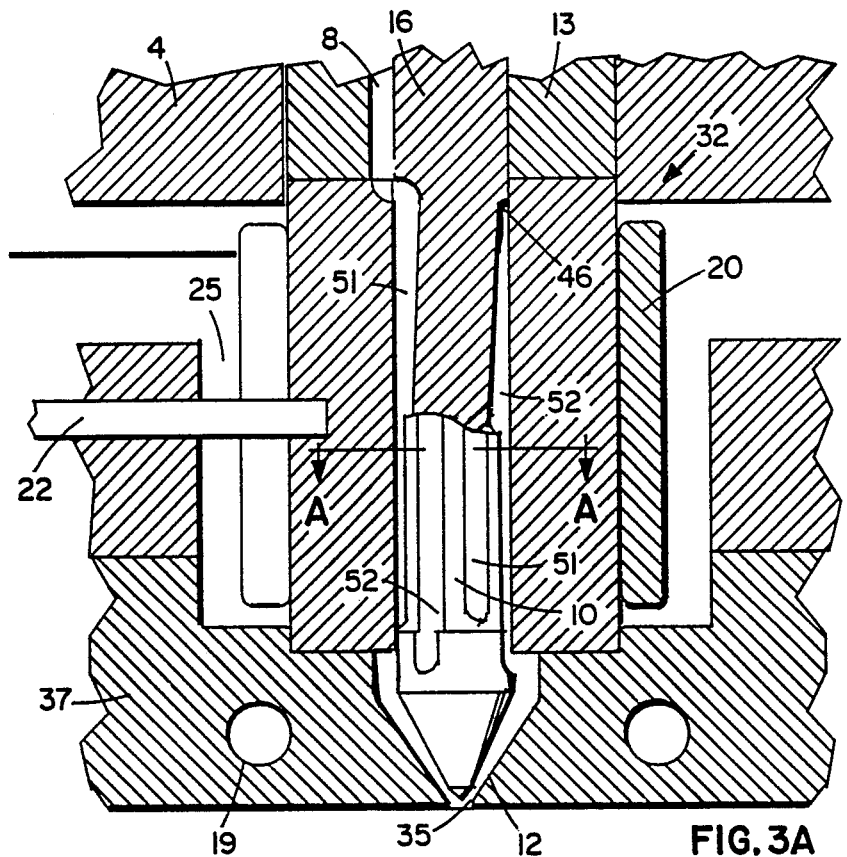
FIG. 3A
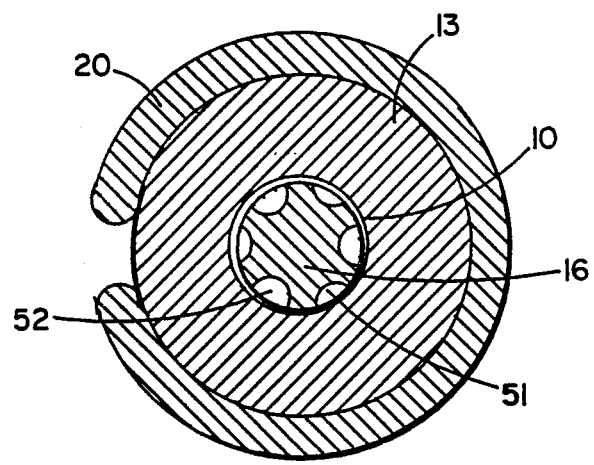
FIG. 3A-AA

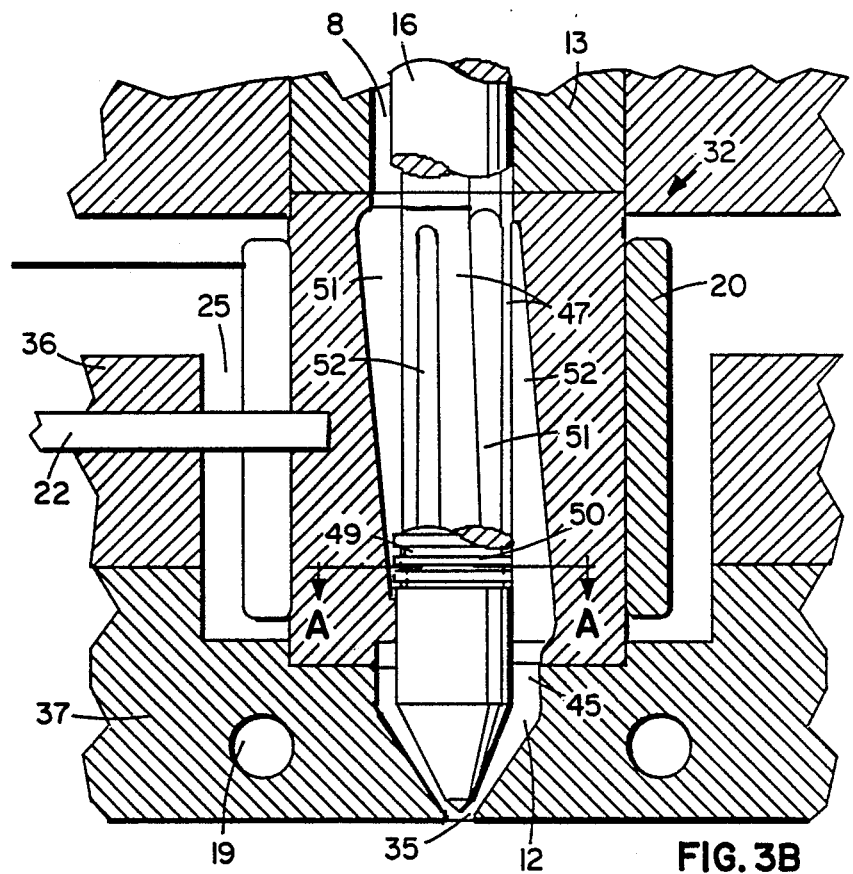
FIG. 3B
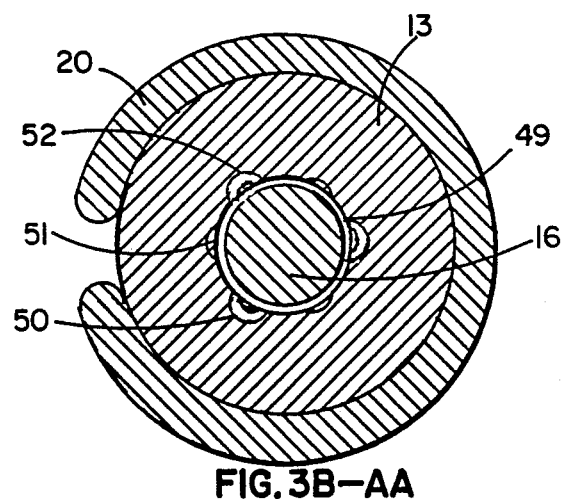
FIG. 3B-AA

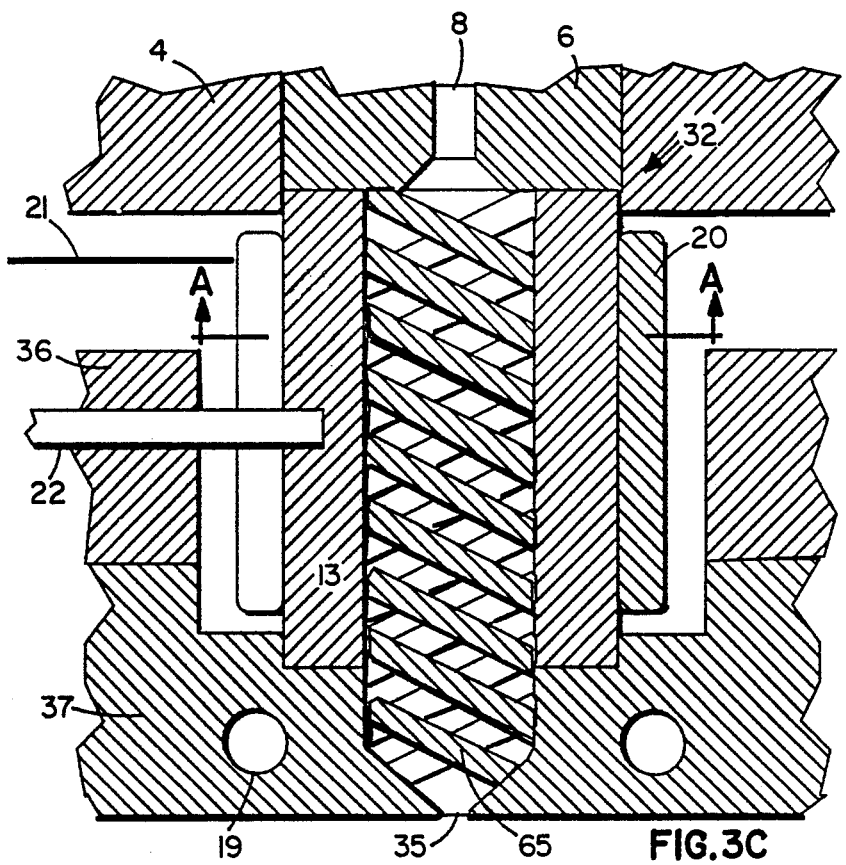
FIG.3C
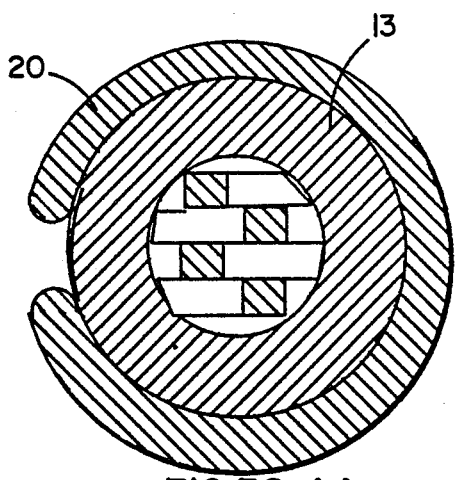
FIG.3C-AA

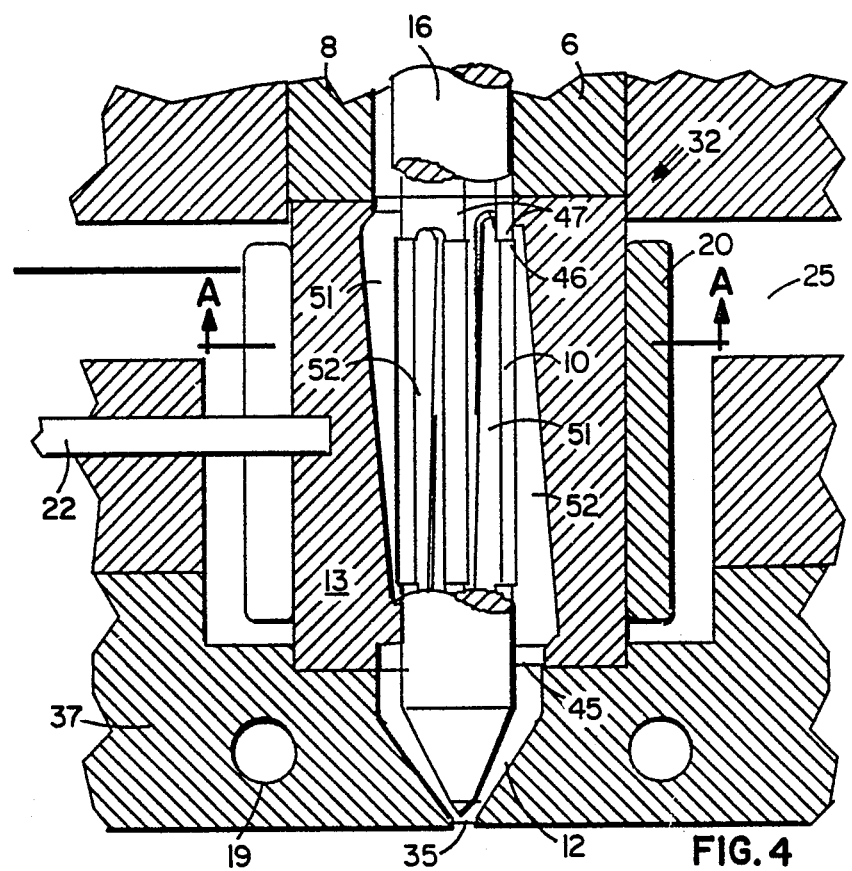
FIG. 4
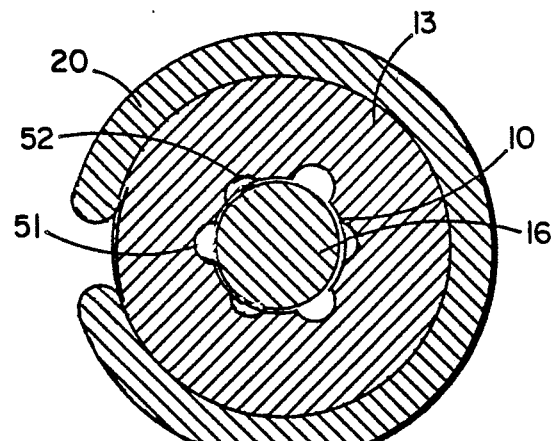
FIG. 4-AA

METHOD OF INJECTION MOLDING THERMOPLASTIC THROUGH MULTIPLE GATES

This is a continuation of co-pending application Ser. No. 07/093,355 filed on Sept. 4, 1987 now abandoned.

FIELD OF THE INVENTION

The present invention relates generally to thermoplastic runnerless multiple-gated multiple-cavity and multiple-gated single cavity injection and/or injection/-compression molding apparatus and methods, and more particularly for those higher-degree-of-difficulty molding applications such as optical lenses and disks, large auto windows and panels, and precision electronic uses like printed-circuit-board or connector or computer hard-disk substrate moldings.

BACKGROUND OF THE INVENTION

Whereas thermoplastics have had widespread use in reciprocating-screw injection-molding machines and processes for about three decades, the largest volume of thermoplastic material is consumed by low-precision moldings from the so-called commodity thermoplastics families (i.e., polyolefin, polystyrene, vinyl). More recently, and in the last decade especially, higher-degree-of-difficulty applications of new, higher-performing engineering thermoplastics have evolved These engineering thermoplastics' applications have extended the range of plastic molding into what has traditionally been the domain of nonplastic materials (such as glass, in the case of optical materials; or precision-machined metals, ceramics or reinforced thermoset composites, in the case of electronics uses). Compared to the more common high-volume thermoplastics polymer families, these new engineered thermoplastics typically are characterized as being:

(1) Substantially more expensive per pound ($2.00–$20.00 per pound);

(2) Possessed of a relatively higher melt viscosity at their recommended processing range;

(3) Usually amorphous polymers (thus, lacking the easy fluidity of crystalline polymers above their melt temperatures);

(4) Molded at temperatures commonly 100–200 degrees higher than the commodity thermoplastics.

These high-performance, difficult-processing thermoplastics are required to meet stringent molded-product quality standards, which in turn depend greatly upon the melt's quality, as delivered into the mold cavity These optimal melt quality requirements are detailed in Applicants' co-pending patent application, Ser. No. 06/929,399, filed Nov. 7, 1986 now abandoned, regarding improved reciprocating-screw plastication. Even achieving optimal melt quality as it leaves the machine's nozzle, however, is not sufficient to assure its suitability when it actually enters the mold cavity, and this is especially true for the more complex melt delivery systems inherent in multicavity molds. (Perhaps, as appears to be the case in plastication processes, less attention has heretofore been paid to melt quality in injection molding than in extrusion processes.) Too often the mold operator increases the temperature as a simplistic answer to such problems, often to the point where the increased heat history given the plastic can no longer be tolerated.

Limitations of Multicavity vs. Single Cavity Molding

The typical course of events in developing such a new and challenging use for engineering thermoplastics is to start prototype molding with a one-cavity mold. Assuming the molded article's weight is at least a few grams and the expected market forecast is for sufficiently high volumes at an acceptable production run duration, then typically the lowest unit costs favor multiple cavity molding process of the new product. However, when molding these new products involves the higher-degree-of-difficulty factors stated above, it frequently is found that the inevitable compromise in product quality and molding process operating latitude that occurs when going from single-cavity to multiple-cavity may be prohibitive.

With the exception of extremely tiny parts, simultaneous multi-cavity molding of a given product utilizing a given molding process is never superior to, or even statistically equal to the average quality obtained with these same processes and materials comparably run as a single-cavity process in a suitably-sized and comparably-equipped molding machine. Long-run statistically-based quality control measurements confirm this repeatedly, and a certain amount of this statistical decline can be expected simply because it is so difficult to do exactly the same thing, simultaneously, again and again at every cycle, uniformly in every cavity, as one could do in a single, one-cavity mold. Independent variables of product quality include the injection fill rate of the plastic melt, the average melt temperature for each cycle and time-dependent melt temperature fractional distribution entering each mold cavity within each cycle, the mold cavity thermal uniformity, the packing pressures and mold times utilized in creating a plastic of exactly the same melt density at the time of solidification. All need to have absolutely no variation from one cavity to the other within the same mold cycle in order for a multi-cavity process to merely equal its analogous, one-cavity process in statistical quality and consistency.

These quality-determining variables or parameters can collectively be thought of as contributors to cavity imbalance within a given multi-cavity molding process. If any of these variables are uncontrolled (and thus variations from cavity to cavity simultaneously occur), then the variable of greatest deviation from a desired norm is said to be "the cavity imbalance problem" for that process. However, apart from these issues of multi-cavity imbalance problems, when comparing a specific one-cavity injection-molding process running at its optimum conditions to the analogous multi-cavity molding process by any of the currently-known methods and apparatus, all processes are inherently deficient and "less capable processes" when measured by at least one, if not all, of the following quality-determining variables specifically related to the melt-delivery system employed in each molding process:

(1) Maximum melt fill rate;

(2) Melt quality and, in particular, a minimized "accumulated heat history" while maximizing fluidity and thermal homogeneity of the incoming melt to the mold cavity;

(3) Minimal cooling cycle time and temperature uniformity within the cavity.

Prior Art in Multicavity Melt Delivery Systems

The simplest and most conventional extrapolation from a single-cavity process into multiple-cavity is a "cold runner" system. In its simplest form, a single-cavity mold with a cold sprue bushing, the melt-delivery system is simply the passageway formed in the mold adjoining the nozzle tip an the mold-cavity gate. For multi-cavity mold design, the simplest extrapolation of this would be a plurality of such passageways coming off of a central sprue and distributing as equally as possible for incoming melt to each respective mold cavity; these runner systems are most commonly created at the parting line of the two mold halves, but also can be located entirely within the stationary, or "A" half, of the mold by means of a 3-plate design.

Drawbacks for such a cold runner system are:

(1) The production of quantities of thermoplastic scrap which are not part of the final product, and which must usually be manually separated from the product (these add labor costs). This runner scrap is either re-ground and re-consumed in the subsequent molding, if permitted, or sold for a relatively-low percentage of the per pound price of virgin resin. Many medical, optical, or aerospace and military applications refuse to allow the use of such re-ground runner scrap because of likely contamination, polymer "heat history" degradation, or other detrimental effects of such non-virgin material introduced into and reducing the quality of the finished product. In such cases, considerable economic loss is encountered by generating such scrap.

In those cases where re-ground scrap is tolerated, there usually is a certain permissible ratio of such re-ground-to-virgin resin in order to keep quality reduction to some minimal or acceptable level. Again, the higher the precision inherent in the product, the less tolerable such deliberate adulterations in quality are permitted.

(2) Reduction in cavity fill rate.

As the incoming melt traverses these inherently-longer melt flowpath lengths (compared to a simple, single-cavity mold by analogy), the melt conductively loses some of its heat to the surrounding metal of the runner system, as shown in FIG. 2A; when viewed in cross section, one sees rapidly-solidifying skin formation and progressively warmer, less viscous polymer layers as one progresses inwardly from the outer wall. As each of such a runner system's orifices experiences these melt-state changes, an overall, rapid frictional drag builds up. The resulting pressure drop (calculated as the difference between the initial melt pressure measured at the nozzle and the melt pressure just upstream of the gate) and temperature drop (calculated as initial melt temperature at the nozzle compared to the melt temperature measured just upstream of the gate) will both be greater than would be the case for the analogous single-gated one-cavity molding, which inherently uses a much shorter flow path. These differences in melt temperature and driving pressure in turn create undesirable polymer rheological problems since the reduced melt temperature of any given thermoplastic polymer means that it has inherently increased in its viscosity and, secondly, the lower effective driving force means that this more-viscous melt's increased resistance to flow is met with decreasing force.

Also, examination of fluid flow mechanics shows laminar (vs. turbulent) flow to be almost universally the case. The hottest material will always be in the center of the runner passageway (assuming a round cross-sectional geometry), with temperature decreasing radially therefrom. Looking at cross section AA of FIG. 2A, such a runner passageway depicts an isothermal contour map; the longer the required melt flowpath (i.e., the longer the runner length required), the worse this thermal gradient problem becomes and the greater the likely thermal inhomogeneities of the melt delivered to any individual cavity.

(3) Cooling cycle time.

In the case of the conventional injection molding processes, it is necessary to have very large diameter orifices and gates in order to permit higher pack-and-hold pressure and freeze-off times for best control of melt and density as the final part is being formed in the mold cavities. However, when such large runner and gate dimensions are required, it is not uncommon that the product itself will be solidified and thus ready for removal or ejection from the mold before the larger thickness runner is itself sufficiently cooled and solidified to be ejected. In a cold-runner design, these types of molding processes frequently wind up having the cycle time dictated by the cooling rate required for these large runner systems.

For reasons mentioned above, though conventional cold-runner systems are frequently the simplest to design and easiest and cheapest to fabricate, they suffer greatly from not only higher unit costs of production due to material runner scrap and labor costs for separation and/or regrind, but also vary considerably in the attributes of quality (thermal inhomogeneity of melt, sluggish fill of viscous polymer which creates relatively-higher levels of molded-in stress orientation) as well as not infrequently considerably longer total cycle times due to cooling inefficiencies.

For all these reasons, more sophisticated multicavity molding increasingly chooses to use a runnerless mold design (or at least to minimize some very short cold runner adjacent to the part; this is commonly called a "short runner"). These runnerless thermoplastic injection molding designs minimize or totally eliminate "runner system" scrap and attendant labor costs and quality reduction. Thus, mold designs can be either of the insulated runner or hot runner types. The insulated runner is simpler and less costly to build than the fully hot-runner system and thus lies intermediate between the fully cold-runner system and its more sophisticated and expensive to fabricate hot-runner type.

Such insulated runner systems are characterized by greatly-oversized melt passageways in the mold system sized so that, in the normal mold cycle time, central portions of the passageway are never allowed to cool sufficiently to solidify, although the outer portions are totally solidified and thus serve as a thermal-insulating barrier against further heat loss from the central portion. These distributing passageways, in turn, are usually coupled with some sort of a heated probe for a relatively shorter length of melt flow path which can be temperature compensated to control flow rate from the end of the insulated runner portion into the mold cavity's gate orifice.

Such systems obviously have as an inherent disadvantage a gross thermal inhomogeneity within this melt-delivery system; for example, in FIG. 2C, such a cross-sectional view "AA" is given. By definition, the solidified portion is well below the melting-point temperature of that particular polymer, and the central passageway temperature must be sufficiently above that melt-point temperature to provide easy flow with minimal resistance. Therefore, a temperature gradient between these two extremes of 100° F. is quite common and, consequently, as each cycle's shot is delivered, sweeping through all variety of partially-solidifying, high-viscosity materials, along with very low-viscosity, high-temperature material, a very inhomogeneous mix of relatively-poor melt quality is the result. In recognition of this problem, the use of an insulated runner is generally not recommended for thermoplastics having a narrow range of useful melt temperatures or prone to thermal depolymerization. Consequently, only commodity polyolefins and polystyrenes are most commonly used in non-critical product applications with insulated-runner molding systems (reference DYM; *Injection Molds and Molding*, Chapter 13, "Runnerless Molding," pp. 209-226). Some modest advances in hybrids of insulated runner with heated-probe temperature control have been made (Muller U.S. Pat. Nos. 4,340,156 and 4,609,341).

Turning now to fully hot runner mold designs, these delivery systems are most complex to design and most expensive to fabricate and most sophisticated in their control features (See, for example, "Hot Runner Molding: A System for Every Need," *Plastics Equipment and Machinery*, October 1985, pp. 30-34; "Molders Warm Up to Hot Runner Molds," *Plastics World*, June 1986, pp. 40-45.) Common to each runner design is an internally-heated manifold block wherein the incoming melt delivered from the nozzle via melt sprue passage is distributed first in an X,Y plane (usually within one mold plate suitably bored, to which at each terminus is fitted a Z-axis polymer "drop" bushing. These bushings are alternatively electrically heated from within by means of a heater element cast or inserted into suitably high thermal conductivity probe bodies or alternatively may be heated externally by means of electrical heater bands, in which case heat flux comes in from the outer wall).

Compared to these alternative cold and insulated-runner designs, control of melt thermal nonuniformity is improved, but not eliminated. After all, at its very optimum, theoretically the contents of the hot runner's melt delivery system would be 100% transferred to the mold cavity on each cycle. In practice, however, even within the one cycle there still exists inherently a substantial thermal gradient, since from the end of the injection portion of the cycle onward to the start of the next, there is no movement within the melt, and this stagnant melt thus thermally stratifies into its respective plot of isothermals as shown in FIGS. 2E and 2D. FIG. 2E shows in cross-section AA the isothermal plot of a bushing in which an internally-heated probe is utilized; in this case, warmest temperatures are those directly adjacent to the probe and the coolest are at the bushing wall surfaces, with intermediate temperature varying accordingly. FIG. 2D shows the effect of an externally-heated bushing with no internally heated probe in which the reverse is the case, with the highest melt temperature being next to the heated surface and the coolest being that at the center line of the passageway.

Another disadvantage of prior art hot-runner systems is that they are unable to thermally isolate these heated members from the stationary-half mold cavities. Thus, the greater the heat loss from the hot-runner system transferred to the mold cavities in that same stationary-half mold stack, the poorer the efficiency of cooling time. Correspondingly, the heat transfer paths are non-randomly distributed locationwise within the multi-cavity moldset, leading to relatively warmer and cooler portions, which add to the thermal imbalance and cavity-imbalance problems of multi-cavity molding.

Thus, even though hot-runner systems can reduce or entirely eliminate runner system scrap and attendant costs of labor, they still cannot avoid substantial thermal gradients in the best possible case where the residence time in the melt-delivery system is equal only to the time required for one complete molding cycle. So substantial variation in melt temperatures and viscosities will ordinarily result when the next injection fill is delivered and this molten material flows into the mold cavity (with the only chance of any mixing occurring if a sufficiently-restrictive gate orifice size is used). Until recently, slow-responding temperature-measuring devices masked these melt quality problems even if one were looking for them (though few molders do). Now, infrared sensors that "see" into the melt provide new, instantaneous data on the melt state.

The consequence of this melt-thermal inhomogeneity is particularly detrimental in the case of optical molding. Such variations in the incoming melt (whether in temperature, density, or viscosity) will create localized differences in the light-bending power of the resulting transparent thermoplastic optical product; these spot-to-spot variations in refractive index can be easily identified under polarized light wherein the change in phase angle is detected, or just visually in regions of adjacent differences in refractive index which create minute aberrations in the image quality of optical lenses.

These optical inhomogeneities can either exist on a micro or macro scale. Such clear specks are commonly high molecular weight, three-dimensionally polymerized gel particles or incompletely melted "unmelt particles" of the original pellet thermoplastic resin which managed to pass through the plastication processes without fully melting. Either type of transparent particle will bend the light differently from its adjacent matrix resins and thus produce an optical flaw. The macro-type flaw is more of a matter of boundary layers wherein incoming melt injection fill of the mold cavity "fractures" into multiple fractions, each of which have different melt temperatures, resulting in differing viscosities which, in turn, result in different flow velocities when driven by the same overall average melt pressure of injection.

Since density is also a function of temperature, it follows that the fastest-moving fraction of the incoming melt will also be the least dense. Since these nonuniformities are distributed throughout the mold cavity during solidification, each region will have a somewhat different refractive index depending upon its ultimate plastic density. In general, the term "birefringence" is a quantitative means of identifying such localized differences in refractive index, region by region within the molded optical product. The pure ideal, of course, would be to have no birefringence; in other words, one common and uniform refractive index in all portions of the resultant molding. Birefringence also generally is roughly proportional to the level of molded-in stresses remaining in the solidified part and also the degree of orientation in the part formation stages.

Other, nonoptical uses for engineering thermoplastics electronics also makes demands upon quality and thermouniformity. For example, injection-molded printed circuit boards or computer hard disk substrates are examples of products having high aspect ratios (length of melt flow path divided by part thickness). Any flow imperfections generally show up subsequently in either downstream operations or ultimately in unsatisfactory product field failures. For example, printed circuit board injection molding advantageously incorporates into the mold pins strategically placed where a hole of precise dimension and location is desired. These pins act as impediments to flow during cavity fill and part formation, resulting in knit-line or weld-line flaws and molded-in stress concentration points. Since these molded circuit boards subsequently are expected to survive severe chemical stress attacks (i.e., chemical etches and plating-chemistry baths used to deposit the desired conductive circuit pathway patterns) and severe thermal stresses (wave soldering or vapor-reflow soldering, temperatures of which considerably exceed 400° F). If the molding process results in high molded-in localized stresses or polymer orientation, then objectional distortion or warpage will result, causing the imprecise alignment and location of holes, circuit contact paths, etc. (which is required for automatic insertion of circuit board devices and assembly operations).

Although there have been relatively large numbers of patents related to hot-runner molding of thermoplastics in the last decade, most teach how to control flow at the gate orifice (such as various spring-actuated or cylinder-driven valve-gating techniques and corresponding hot-sprue bushing shutoff). Other recent patents on hot runners seem to recognize the thermal isolation problem, but only deal with it by means of mechanical separation during the "mold open" portion of the mold cycle, which is a relatively small percentage of the total cycle time (see, for example, Aoiki, U.S. Pat. No. 4,298,332 and Ando et al, U.S. Pat. No. 4,212,624).

No known patents disclose means for maximizing thermal homogeneity of the melt delivered to each cavity of a multicavity injection mold. No known art teaches how to maximize melt temperature entering the multiple mold cavities without significant increase in polymer heat history.

Prior Art: Melt Conditioning Elements

Well known to thermoplastics processing art is the use of melt-filtering elements to remove entrained solids from a flowing meltstream. Such is the common screen pack at the outlet die of an extruder, consisting simply of a series stack of wire fabric screen--most often of decreasing aperture size, to provide for removal sequentially of firstly, largest diameter solids and lastly, finest particles--supported by orifice-bearing retention plate and with provision for screen changeover while extruder flow continues. Of course, the wire itself is subject to metal fatigue, especially if used upstream of the nozzle tip in injection molding, whose intermittent injection fill cycle creates a very fast-moving melt shockwave or pulse, which can break down the screen itself and release resulting debris into the meltstream.

For this reason, better suited for injection molding melt filtration are more robust, torpedo-shaped filter devices housed in the nozzle adapter or extension thereof, and with filtering solid-particle retention taking place in either male or female member of the assembly or at the restrictive clearance between male and female. Commercially popular examples thereof include EMI "Linear Edge" Filter (Jackson Center, Ohio), shaped like a miniature Maddock mixhead on torpedo body; U.S. Pat. No. 4,434,053 (Osuna-Diaz); U.S. Pat. No. 4,097,216 (Putkowski); and Mold-Masters Systems' "Pure-Melt" (Wooster, Ohio) as described in U.S. Pat. Nos. 4,280,908 and 4,256,584 (Lord and Gellert). These in-the-nozzle filters are used mostly to remove non-plastic contaminants (especially if regrind scrap is being used), or to prevent valve-gate plugging in hot runner molds.

Another type of melt conditioning element is melt homoqenizers analogous to the well-known "motionless mixers" used in in-line fluids mixing systems. These may typically consist of a 3-dimensional latticework rigidly joined at each intersection and open passages taking 90 degree changes in flowpath angle--as described in U.S. Pat. No. 4,027,857 (Cunningham), or as embodied variously in Sulzer's SMX, SMV, SMXL configurations, available in U.S. through Koch Engrg., N.Y., N.Y. See reference articles ("A REPORT ON THE MIXING EFFICIENCY OF STATIC MIXING UNITS IN LAMINAR FLOW, presented to 73rd Annual AICHE meeting 10/20/80 by P. T. Alloca of KOCH; also "MIXING EFFICIENCY OF STATIC MIXING UNITS IN LAMINAR FLOW", by the same author, FIBER PRODUCER, April 1982), in which various competing commercial designs are tested.

An alternative approach uses contoured leaflike 180-degree helix sections (alternating righthand and lefthand), through which is passed the pressurized fluid (in this case, the meltstream). Such an example is U.S. Pat. No. 3,953,002 (England et al); commercial examples include LUWA "Thermoprofiler" (TM) (Charlotte, N.C.); KENICS "Thermogenizer" (North Andover, Mass.), both used solely in extrusion.

Yet another alternative employs Venturi effect to induce differing velocities at exit ports of suitably sized and spaced apertures within a barrier member interposed into the flowpath of a fluid melt. See U.S. Pat. No. 4,478,516 (Kessler).

Other melt-distributing static mixers include those forcing multiple large-angle flowpath directional changes, such as U.S. Pat. Nos. 4,591,274 (Salla), 4,054,273 (Neuman) and 4,434,053 (Osuna-Diaz). The latter claims to combine both mixing and filtering, though almost any of the above-cited designs afford at least some slight degree of both, if they employ any restrictive clearances through which meltflow must take place.

Usually, these types of "motionless mixers" injection molding uses are for on-the-machine color-bending of concentrated color with uncolored base resins, wherein these mixing elements are incorporated into the nozzle adapter, downstream of a plasticating screw and upstream of the mold. (See, for example, "Thermoplastic Processing with SMX Static Mixer," *European Plastic News*, March, 1984).

In general, the higher the degree of filtration or the more intensive the mixing required, the greater the melt's pressure drop will become, and the slower the meltfront's downstream average velocity will be. All these motionless melt-conditioning devices must shear, to some extent, the melt in order to achieve its function, thus inducing at least some degree of frictional heating of the melt passing through these fixed-position, geometrically-spaced baffles and/or constricting orifices to change directions and velocities and thus become distributively mixed and/or filtered.

So, both of these types of melt-conditioning elements induce a pressure drop which is directly proportional to its efficacy. This flow impedance in turn generally adversely affects injection molding's cavity filling and part forming operations, which in turn affect quality, especially for the high aspect ratio, difficult-to-fill optical or electronics products mentioned earlier. Attempting to overcome these rheological side effects usually results in increasing the melt temperature, but especially in multicavity runnerless injection molding where this superheated melt must reside for at least one or two cycle times before entering the mold's cavities; this results in thermal, polymeric degradation problems. The higher the base polymer's intrinsic viscosity and the narrower its "processing window," the more difficulties will be encountered. The greater the melt volume contained within the particular runnerless mold, when compared to actual shotsize volume, the worse the degradation, all other things equal. Also, as this superheated melt sits stagnantly within the runnerless mold's melt delivery passageways, thermal gradients form—the hotter the induced temperature rise, or melt passageway orifice diameter, the worse the thermal inhomogeneity of melt.

Although, in a generic sense, melt-conditioning elements providing motionless mixing or melt-filtering functions are decades old, very well known and widely used commercially in the extrusion and injection molding fields, there is no known application of these elements to solve the inherent limitations of multicavity versus single-cavity injection molding. No cited "prior art" patents or commercial product's literature contemplated incorporating any such melt-conditioning elements within an injection mold itself, nor specifically within a multigated runnerless mold wherein said element is located at the furthest downstream terminus of the melt-delivery passageway, just upstream from the mold cavity gate itself. Very specifically, only one passing reference has been found among all the referenced books on injection mold design and molding. That reference (English translation of *Anleitung fur den Bau von Spritzgiesswerkezeugen*, 2nd Ed., 1983, by George Menges and Paul Mohren; Macmillan published and distributed in U.S. 1986, copyrighted as "How to Make Injection Molds," Section 16.3.4, pp. 334–5) follows a section on valve-gating hot sprue or hot runner molds and discusses use of melt filters to prevent valve gate clogging. No other intended benefits or problems are mentioned. As stated on page 334, "FIG. 416 shows a relatively small filter, which can be placed into the mold or the machine nozzle at any time." No elaboration is made, but FIG. 416A shows the torpedo-shaped filter element used in what appears to be the heated sprue bushing of a mold, and 416B shows the same element in an injection molding machine's nozzle.

To summarize, no instances have been found in the prior art where any such melt-conditioning element's design or placement is employed to provide, just prior to gate entry, nearly instantaneous melt heating through deliberate shearing of high-speed melt travel, in combination with creating via restrictive passageway a thin, moving melt film brought into contact with heated walls and surfaces of the melt conditioning element and its associated bushing—which together form said restrictive passageway—with greatest incremental melt heating being provided when:

(1) both male and female members are electrically heated; and (2) the gap therebetween is relatively small in dimension.

This is in addition to simultaneously homogenizing mixing and solids-filtering actions, by means shown of the present invention. Nor are there indications that the benefits of same were contemplated in any prior art references.

Further, no prior art (and specifically the injection/compression or variable-volume molding cavities art referenced in application Ser. No. 860,006 now U.S. Pat. No. 4,828,769) contemplated the synergistic combination of such variable volume mold cavities with melt conditioning elements just upstream of the gates, for either single cavity or multicavity molding.

SUMMARY OF THE INVENTION

Multicavity injection molding of the present invention employs a runnerless or hotrunner/short runner melt delivery system wherein a melt-conditioning element is placed as an integral part of or internal to the melt-delivery passageway leading to each mold cavity and just upstream of each gate. Said element is designed and configured so as to produce near-instantaneous, shear-induced melt heating, concurrently with distributive mixing of melt passing through same during the rapid injection-fill melt-pressurized phase of the injection molding cycle. Said elements furthermore can be easily interchanged or altered by design to produce the desired degree of free flow versus shear heating or versus intensive mixing, or can be re-balanced to give more mixing (through forced directional meltpath changes, thus inducing turbulent flow), or more heating (through constricted clearances and orifices without directional changes, thus causing differential velocities and interfacial shearing forces in adjacent polymer layers within the laminar-flow meltfront).

Thus, melt-quality problems (specifically thermal inhomogeneities from the start of the shot to its end, and freedom from entrained unmelt or gel solid particles) can be overcome without incurring polymer thermal degradation problems in their stead.

Bearing in mind that "heat history" is defined as the integral of melt temperature over time, such detrimental effects are minimized when the shape of that curve is relatively steeply sloped. This desired effect is best attained, in an especially preferred embodiment of the present invention, when the melt-shear-inducing elements are additionally controllably electrically heated—to add BTU's to the passing melt film via thermal conduction in addition to the frictional heating so induced. Even faster thermal "ramp-up" of melt temperature vs. time and vs. axial melt travel is obtained when both male (i.e., torpedo-shaped probe) and female (i.e., bushing interior wall surface) members are so electrically heated, in a preferred embodiment.

By deliberately positioning those melt-conditioning operations which inherently create shear heating in the melt as close as possible to the gates into the respective mold cavities, high temperatures are generated only while high speed melt travel is going on (induced by the rapid-fill injection, commonly 0.2–2.0 second in duration) and immediately thereafter, the now-hot-and-homogeneous melt is in the cavity already starting to be force-cooled. This extremely brief high-temperature excursion allows very unconventionally-hot melt temperatures (as measured in the mold cavity itself by extremely fast responding infrared sensors) to be used which significantly exceed those maximums tolerated for reciprocating screw melt plastication (measured just upstream from the nozzle by equivalent IR means), due to the latter's much longer residence times at those elevated temperatures.

This higher allowable temperature of melt entering the mold cavity gives, obviously, for any given polymer and molecular weight grade of same, a lower viscosity and easier flow within the cavity, as well as a most uniform viscosity (since the melt is thermally homogeneous). All these are benefits of the present invention.

The main drawback of the present multicavity invention, compared to analogous single-cavity molding processes, is the slower fill rates and higher pressure drops incurred, all other things being equal. However, even this drawback can be largely offset by increasing the injection driving force of the given molding machine (though at some increased, one-time capital investment). For example, a given optical product may call for a 4-ounce shot size. Rather than running in a conventional 8-ounce machine, this can be run, using the present invention, in a machine with a 14-ounce injection unit equipped with a "downsized" 8-ounce barrel and screw. This downsizing gives about 50% higher injection pressures. Alternatively, a retrofit accumulator assist for the injector may be installed for the same purpose.

An especially preferred embodiment combines the melt delivery system of the present invention with the variablevolume mold cavity, injection-compression molding processes discussed and/or disclosed in Applicants' co-pending U.S. patent application filed May 5, 1986 (Ser. No. 860,006 now U.S. Pat. No. 4,828,769). Though any of the non-air-gapped, closed-cavity injection-compression means cited in the prior art (including specifically Johnson, Weber and Laliberte) could benefit synergistically with improved melt delivery and quality as disclosed herein, for reasons given in Ser. No. 860,006, the most preferred such combination for multicavity molding is the Applicants' claimed pre-enlarged and oversized mold cavities which are simultaneously and uniformly acted upon compressively by a CNC-controlled force, most preferrably the movable platen's clamping motions.

BRIEF DESCRIPTION OF THE DRAWINGS

FIG. 1 shows in sectional view a multicavity melt delivery system of the present invention, with melt conditioning elements located just upstream of each gates' inlet.

FIGS. 2A and 2B show a conventional cold runner 3-plate mold in closed-stack and in separated-stack positions;

FIG. 2C shows an insulated runner mold;

FIGS. 2D and 2E shows a hot runner manifold with and without heated probes in the bushing. In addition, each example also shows, in a cross-sectional view AA of the bushing, the melt temperature gradients, by means of a plot of isothermals.

FIGS. 3A and 3B are enlarged sectional views of the bushing and gate areas of certain embodiments of the present invention, with commercially available, torpedo-configuration melt-conditioning elements shown internal to the meltstream and controlled electrical band heater mounted externally on the bushing's wall.

FIG. 3C shows another embodiment of the present invention, wherein a static mixing element of the kind discussed in the prior art section (specifically pictured is the Sulzer/Koch type) is placed internally into the externally-heated bushing and located in the melt passageway just upstream of the gate. Compared to FIG. 4, a lesser degree of rapid heating or melt filtration is obtained, but a greater degree of distributive mixing and lower pressure drop is obtained.

FIG. 3A-AA is a cross-sectional view taken generally along the lines A—A of FIG. 3A.

FIG. 3B-AA is a cross-sectional view taken generally along the lines A—A of FIG. 3B.

FIG. 3C-AA is a cross-sectional view taken generally along the lines A—A of FIG. 3C.

FIG. 4 shows a preferred embodiment of the present invention, analogous to FIG. 3 except the controlled heat source is a two-zone, smooth-profiled probe of the Spear Systems (Chatsworth, CA) type fitted internal to a custom-machined bushing.

FIG. 4-AA is a cross-sectional view taken generally along the lines A—A of FIG. 4.

DETAILED DESCRIPTION OF PRESENT INVENTION

Figure 2A:
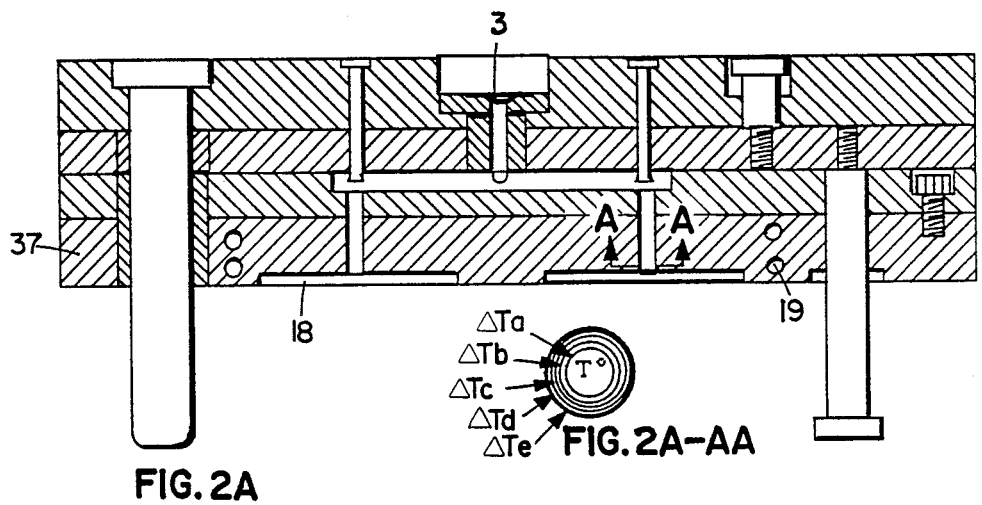
FIGS. 2A, 2A-AA, 2B, 2B, 2C-AA, 2D, 2D-AA, 2E, and 2E-AA show moldstack sectional views of comparative examples of prior art multicavity melt delivery systems.

Referring particularly to FIG. 1, the plasticated melt (not shown) for the next injection molding cycle has been prepared in the reciprocating-screw machine (not shown) and, when the screw (not shown) acts as a plunger (traveling axially forward at high speed during the injection-fill portion of the cycle), the melt is pressurized and forced through the nozzle adapter (not shown), through the nozzle tip (nested within the locating ring 2 of the mold assembly) and enters the mold via the sprue bushing 1. The passageway 3 within the sprue bushing meets in fluid communication with a passageway 15 established within the heated manifold (here shown heated by cartridge heaters 26 under control of thermocouple 27), wherein the Z-axis travel is terminated and the melt is split and distributed within the X,Y plane into multiple, generally smaller-diameter passageways of generally equal cross-sectional area. Each such distributive passageway, in turn, feeds one or more mold cavities 18 of the multi-cavity moldset 34 and 37 (which is maintained at lower temperatures than manifold 32 by circulating coolant channels 19), and the melt passageway terminates with, again, a generally smooth transition 7 back into Z-axis travel passageway 8. Shortly thereafter, the heated manifold passageway 15 terminates at bushings 5, 6 and 13 forming passageways 7, 8 and 9 respectively, which are maintained in fluid communication with the corresponding manifold passageway 15.

In the present invention, the melt can be maintained at the desired temperature by means of electrical heaters applying their energy as a band heater 20 with associated thermocouple 22 control, external to the cavity bushing 13 (wherein transfer is conductively and radiatedly supplied to the melt contained therein) and optionally supplemented by means of an electrically heated probe 14, 16 (which is located internally to the melt passageway and which may consist of one or more temperature control zones) or a combination of both types.

Referring now to the expanded view of the individual mold cavity and mold-filling mechanism, FIG. 3A shows an embodiment of a melt-conditioning element in half-cross-sectional view. Note that the melt at inlet passageway 8 of the torpedo-shaped device (which resembles a Maddock mixing head 16) enters a plurality of milled and polished inlet melt channels 51 provided for the purpose, and runs into a constricted end of tightly controlled clearance with the bushing wall 13. It is this controlled geometrics relationship of male device 16 and female bushing wall 13 which provides the stated melt conditioning effect, along with controllable thermal input obtained conductively from bushing wall 13 in contact with electrically heater 20 and thermocouple 22.

For the melt to pass onward, it must flow over this constrictive land 10 and thus join this associated exit melt channel 52 to the inlet melt channel 51, thus both providing melt shearing (the narrower the clearance and longer the land, the greater the extent to which such frictional melt heating will occur), melt filtration (entrained solids or unmelt particles will be retained if their diameter is greater than the clearance dimension of the land), as well as some degree of melt homogenizing mixing (by designing right-angle bend traverse to the melt-flow path at both inlet and outlet, these changes of direction somewhat break up the otherwise laminar flow of the melt). It will be obvious to those skilled in the art that relative degrees of said shear heating, melt filtration, and melt mixing can be readily adjusted by changing the clearance dimensions, land length, and number of such flowchannels established within the torpedo-like device. Also, such configurations can easily be staged sequentially one after another, to provide a multiplicity of such conditioning steps; for example, the illustrated FIG. 3A single-stage conditioning device resembling a simple Maddock mixing head could easily be tripled, as is the case with EMI "Linear Edge" Mixer referred to in discussion of Prior Art.

Having now passed through the inlet 51, land 10 and exit 52 channels of the melt conditioning element formed constructively by torpedo-shaped device 16 and bushing wall 13, the melt is now superheated and freshly homogenized—in optimum condition for use. Therefore, it is important to minimize the length and volume of any remaining flowpath from here to the gate 35 and into the mold cavity (18, on FIG. 1; not shown on FIG. 3). So, flowpath 12 is minimally sized. Further retention via extended residence time at high temperature only results in thermal degradation and thermal gradients re-forming.

Therefore, either the element is located in extremely close proximity to the mold cavity wherein the part itself is formed (as shown in FIG. 1) or, alternatively, the gate freeze-off is implemented at the terminus of a short cold sprue (not shown but it would start at gate 35 and end a cavity 18). The advantage of the former is in having no runner scrap and a true runnerless molding with no required secondary operations. The advantage of a short cold sprue is its better thermal isolation of the heated melt passageway (maintained at quite elevated temperatures relative to the temperatures maintained in the mold cavity). In short, material or secondary operations savings versus shorter cooling cycle times and less energy usage are the expected and well known tradeoffs.

Another embodiment, shown in FIG. 3B, is similar in many ways to that in FIG. 3A. It also employs an unheated torpedo shaped device 16 inside conductively heated bushing wall 13 to constructively form a metal conditioning element, except that this device 16 resembles a melt filtering device like Putkowski (U.S. Pat. No. 4,097,216) or Lord (U.S. Pat. No. 4,280,908). Specifically, the melt passes from longitudinal interior inlet melt channels to the exterior exit melt channels through small restructive orifices (typically sized 0.020–0.040" in diameter, depending on desired degree of filtration), in a manner described in these referenced patents. FIG. 3B shows the melt flowpath entering via inlet channel 51 into a plurality of longitudinal interior channels 47, out through annular grooves 50 and over annular lands 49 to emerge into exit channel 52. See cross-sectional view 3B-AA. The freshly filtered melt next passes through vestibule 45, passageway 12 and gate 35 to enter the mold cavity (18 on FIG. 1).

A preferred embodiment is shown in FIG. 4, similar in most ways to that in FIG. 3A. However, it employs an electrically heated torpedo shaped device 16 of smooth surface, of a type commercially available from the previously referenced Spear Systems (Chatsworth, CA) and many others, inside conductively heated bushing wall 13, wherein this wall is no longer smooth but is now sculptured to create therein a plurality of inlet 51 and exit 52 melt channels connected by precisely dimensioned land 10. See cross-sectional view 4-AA, which shows the cross-sectional area of inlet channel 51 to be somewhat larger than corresponding exit channel 52. Although a design which provides for equally sized inlet and exit channels at all points along the melt flowpath is operable, the most preferred embodiment is to provide comparatively greater inlet channel size at the relative upstream part of the melt flowpath and, conversely, provide comparatively greater exit channel size at the relative downstream part of the melt flowpath and to make smooth transition therebetween. Typically, the clearance between land 10 and electrically heated torpedo probe device is 0.010–0.050".

Taken together, the smooth male device 16 and sculptured bushing wall 13 constructively form a Maddock mixer type melt condition element functionally equivalent to that of FIG. 3A, except that this FIG. 4 device has now both interior and exterior walls of these melt passageways controllably electrically heated. Whereas the devices of FIG. 3A and 4 show only single-stage Maddock mixing, multistage designs are also easily made, should a higher degree of filtering, mixing or shearing be desired, and are fully contemplated practices of the present invention.

An alternative embodiment, shown in FIG. 3C, comprises a three-dimensional static mixer 65 of an open latticework design well known to the trade (an example being the earlier-cited Sulzer SMX) as the melt-conditioning element which is illustrated directly upstream of the gate 35, as pictured. Melt enters by passageway 8 into the steel latticework (see also cross-sectional view 3C-AA) of static mixer 65, which forces the melt to separate into the channels 51 and 52 provided and then to change directions by about 90 degrees at the junction of the interior wall of bushing 13 to resume flow. Each such "stage" of the preferably multistage mixer provides melt separation and redirection. By determining the opening size of these passageways within the mixer's latticework, and the number of mixing stages, one can determine how vigorous the degree of mixing will be. Bushing 13 is controllably electrically heated by means of heater band 20 and thermocouple 22.

Figure 2B:
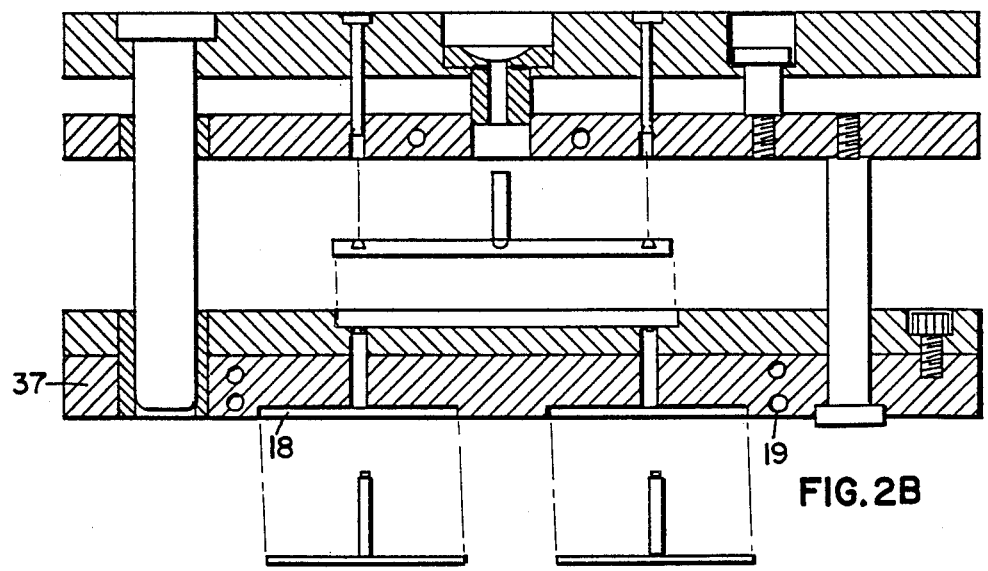

It is immediately evident that, by any one of these embodiments, melt quality and thermal homogeneity immediately downstream and within the mold cavity itself will be superior in a multi-cavity mold than would be any of the known prior art comparative examples shown in FIGS. 2A, 2B, and 2C.

By means of enhanced injection driving force disclosed earlier (by accumulator assist or barrel/screw downsizing of injection unit), the inherent drawback of increased pressure drop across the melt-conditioning elements disclosed will be greatly offset, such that the fill rates and melt-injection pressures will still be sufficient for all general purpose molding tasks. However, it may be insufficient for some very high degree of difficulty molding tasks such as the previously-cited most sensitive optical or electronic parts, and particularly when the molding is a high-aspect ratio shape and/or has nonuniform thicknesses, in combination with high intrinsic viscosity thermoplastics like polycarbonate and/or engineering thermoplastics of PES, PEI, PEEK, PS or liquid-crystal type.

In such very demanding applications, the greater the desired efficacy of the melt-conditioning device (i.e., degree-of-filtration efficiency, the desired "instantaneous delta T" shear heating, or degree of distributive mixing), the greater the corresponding reductions in the melt driving forces which would tend to impair part-formation qualities otherwise.

For such purpose moldings, the preferred embodiment combines the melt-conditioning elements of the present invention with the variable-volume cavity, injection-compression molding technologies discussed and disclosed in Ser. No. 860,006 now U.S. Pat. No. 4,828,769. Most preferably, said variable-volume cavity will be in its pre-enlarged state (movable mold insert retracted in its rearward position) at the time when injection fill first commences. In this manner, the aspect ratio of the mold cavity as perceived by the incoming melt is not of consequence, since the overall cavity volume at that point exceeds even the instantaneously-relaxed and unpressurized melt volume (which has enlarged to its maximum volume at the "P=1 atmosphere" point (4) on the PVT chart shown as FIG. 6. At this point, a free void volume exists simultaneously while the full melt volume has expanded to its fullest point and is totally relaxed for just that instant before the compression cycle starts. In this manner, a unoriented melt has been injected into the mold cavity and is now compressively redistributed into the fully filled-out, ultimate-part dimensions, thus totally changing the orientation and stress levels, compared to conventional molding processes.

A less-preferred embodiment of application Ser. No. 860,006 method, and certain other variable-volume-cavity injection/compression molding methods of the cited prior art of 860,006, employs a floating die or mold insert assembly which is deflected backward by the incoming melt pressure at a very minimal back-pressure resistance, so that the overall enlarged cavity volume after being filled equals that volume occupied by pressurized melt at that temperature and at a melt pressure just equalling the applied resistance force of the movable mold insert. Now the compressive stroke starts, and the rest of the cycle is as described above.

A related embodiment of the present invention employs all the described features of the multigated melt delivery system, as shown in FIG. 1, except that the plurality of gates (35) feed into a single large mold cavity (18*) instead of each gate (35) feeding its own separate mold cavity (18). This can be visualized onto FIG. 1 merely by opening up the parting line formed at the juncture of moldset halves (37) and (34) in the space now shown as shutoff between the two cavities (18), thus forming one larger mold cavity (18*). Such larger multigated thermoplastic moldings are increasingly being used with conventional runnerless melt delivery designs, for example, for automotive body panels and window glazing.

Figure 5:
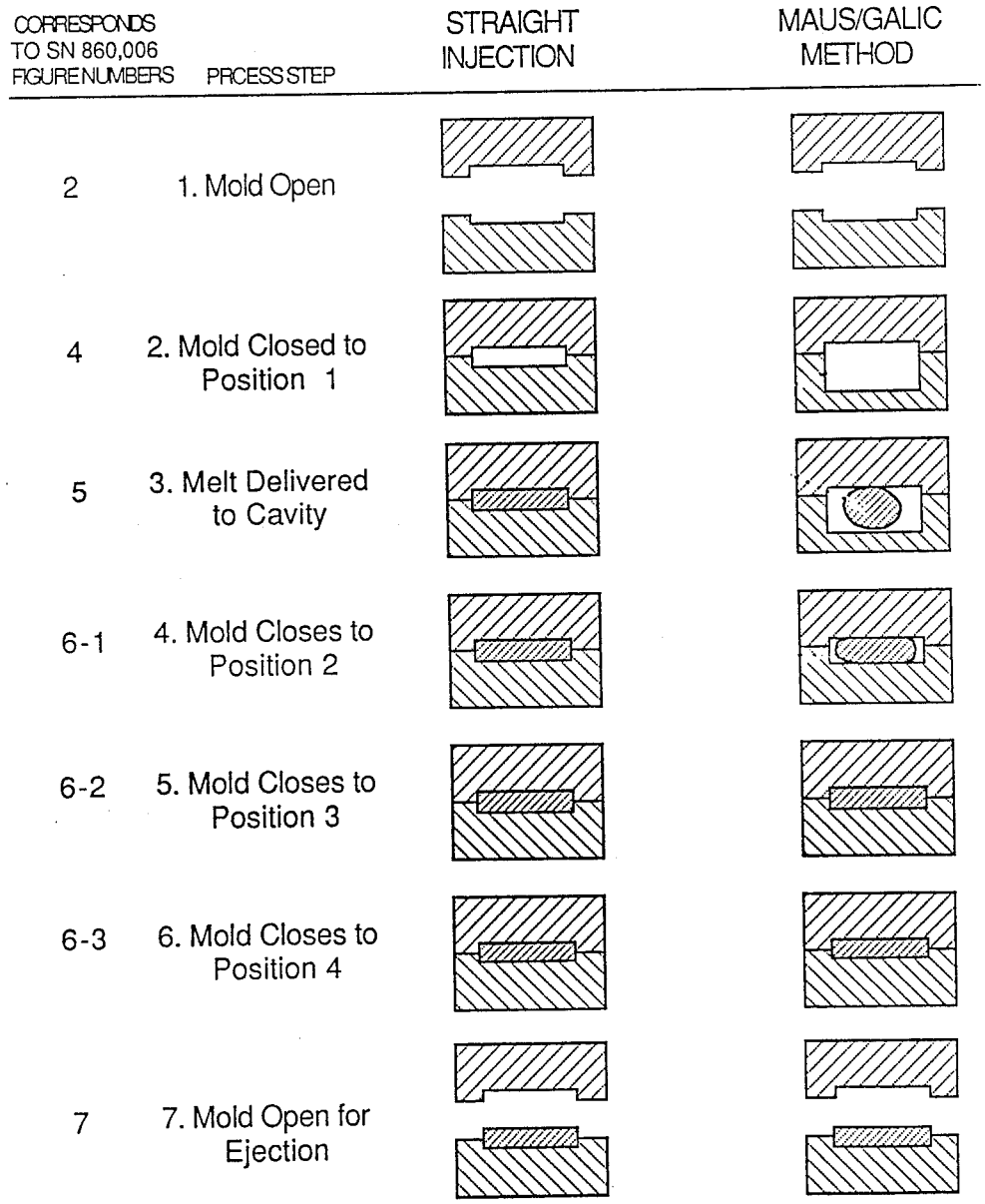
FIG. 5 shows, in enlarged sectional view, the workings of just one cavity of the FIG. 4 multicavity melt conditioning embodiment, in combination with an especially preferred embodiment of co-pending Ser. No. 860,006 variable-volume oversized mold cavities injection/compression molding (labeled MAUS/GALIC) throughout one full molding cycle, and, for comparative purposes, a similar view of conventional STRAIGHT INJECTION MOLDING employing fixed-volumed mold cavities, broken down into a series of sequential steps.

Following FIG. 5 through its sequences, one sees first this rapid injection, next "frozen in time" in its most expanded melt volume, instantaneously relaxed and unoriented state just prior to, in the next stage, very rapid compression and devolatilization (eliminating any void volume) by compressive stroke moving very rapidly against minimum melt pressure. This point is followed next by continued slow travel of the compressive stroke, increasing melt pressure and density, while simultaneously compensating for the ongoing plastic cooling and shrinkage. The bottoming out of the compressive stroke is reached at the predetermined point set for desired final part thickness.

Figure 6A:
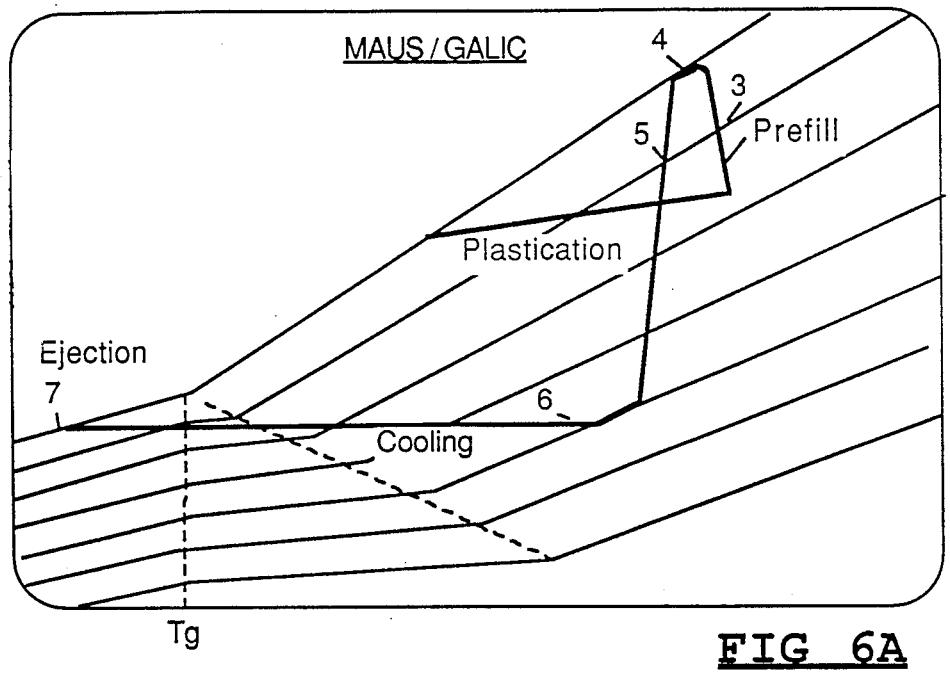
FIG. 6A is a chart of melt PVT (Pressure-Volume-Temperature), upon which is plotted FIG. 5 MAUS/GALIC variable-volume molding process "path" and, as contrast.
Figure 6B:
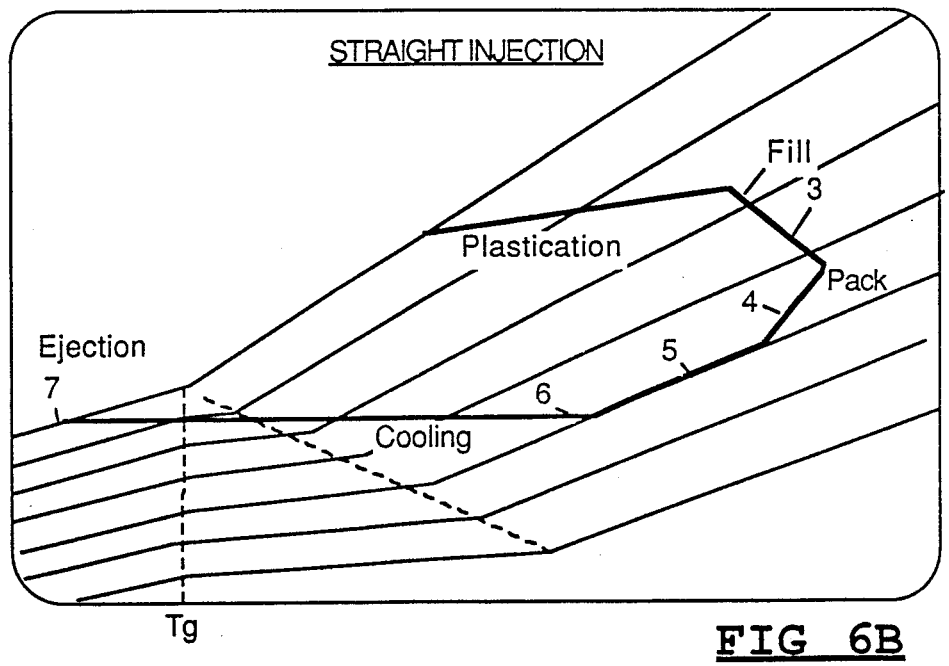
FIG. 6B is plotted FIG. 5 STRAIGHT INJECTION fixed-volume-cavity molding.

This preferred combination of a melt-conditioning element with Applicants' co-pending injection-compression method is especially suited for multi-cavity tasks as optical storage disks and optical lenses (utilizing polycarbonate resins) and electronic printed circuit board and connector substrates (employing previously-listed engineering thermoplastics), wherein this combination allows maximum melt quality while still providing a relatively less torturous path (per PVT chart, FIG. 6).

We claim:
1. In a multicavity injection molding process, a method for improving a thermoplastic's melt quality and increasing melt temperature entering a gate of each cavity of a multicavity mold and thereby improving molded part quality, wherein said improvement is achieved by the method of:
   (a) injecting a plasticated melt under pressure through a nozzle seated in a sprue bushing into a multicavity moldset melt delivery system, said delivery system including melt passageways maintained continuously in fluid communication between the sprue bushing on an upstream end and runner bushings feeding into each mold cavity on a downstream end, the melt contained in the delivery system is intermittently pressurized and depressurized with each injection cycle, and the melt always retains sufficient fluidity to flow as required when next pressurized;
   (b) displacing said melt contained in the delivery system downstream toward the mold cavities, upon each cycle's melt pressurization, the melt must pass through en route melt conditioning elements located upstream of each gate and downstream of each melt passageway, each conditioning element consisting of a male device member of generally torpedo shape housed concentrically within a generally cylindrically shaped female bushing member, a precisely dimensioned annular clearance space between the male and female members, each conditioning element defining longitudinally at least one inlet melt channel which is longitudinally substantially blocked at its downstream end and at least one outlet melt channel which is longitudinally substantially blocked at its upstream end, and said inlet and outlet melt channels are maintained in fluid communication through said precisely dimensioned clearance space defining a constrictive land interposed therebetween, such that melt transferring between said inlet and outlet melt channels must pass over said constrictive land and, furthermore, said melt transferring therebetween must undergo substantial angular change in flow direction as said inlet and outlet melt channels are not coaxially aligned, and each melt conditioning element feeding the melt directly into the gate;

(c) shearing substantially the melt as it flows during the intermittent pressurization of each cycle, within said melt conditioning elements, thereby increasing the melt temperature and mixing the melt by angular flow direction change as the melt is transferred through said constrictive land within said melt conditioning elements; and (d) heating at least one of said male and female members of each melt conditioning element comprising heating said melt conditioning elements to a temperature greater than a temperature of the melt measured upstream of the melt conditioning elements and forcing intimate contact between the melt and said heated members at least during the intermittent pressurization, thereby increasing heat transfer between said melt and said heated members and increasing melt temperature downstream of said melt conditioning elements whereby the melt entering each mold cavity has substantially greater homogeneity, fluidity, and heat content with very minimally increased heat history.

2. A method of claim 1 wherein both the male and female members of said melt conditioning elements are controllably heated from electrical sources and two angular changes of melt flow direction of substantially 90 degrees each are required for the melt to transfer from its inlet melt channel to its outlet channel.

3. A method of claim 1 wherein the substantial shearing of the melt, in combination with the heat transferred from the heated members of said melt conditioning elements, produces an instantaneous melt temperature rise of greater than 30 degrees Fahrenheit, measured upstream and downstream of the melt conditioning element.

4. A method of claim 1, wherein the mold cavities are variable volume mold cavities having a floating die movable mold insert which is deflected backward by the incoming melt pressure at a minimal back pressure resistance force, said force being greater than would be encountered were the mold cavity pre-enlarged to a volume exceeding the unpressurized melt volume but less than would be encountered were the mold cavity volume fixed and limited to that of the final part dimensions.

5. In a multicavity injection molding process, a method for improving a thermoplastic's melt quality and increasing melt temperature entering a gate of each cavity of a multicavity mold and thereby improving molded part quality, wherein said improvement is achieved by the method of:

(a) injecting a plasticated melt under pressure through a nozzle seated in a sprue bushing into a multicavity moldset melt delivery system, said delivery system including melt passageways maintained continuously in fluid communication between the sprue bushing on an upstream end and runner bushings feeding into each mold cavity on a downstream end, the melt contained in the delivery system is intermittently pressurized and depressurized with each injection cycle, and the melt always retains sufficient fluidity to flow as required when next pressurized;

(b) displacing said melt contained in the delivery system downstream toward the mold cavities, upon each cycle's melt pressurization, the melt must pass through en route melt conditioning elements located upstream of each gate and downstream of each melt passageway, each conditioning element consisting of a male device member of generally torpedo shape housed concentrically within a generally cylindrically shaped female bushing member, a precisely dimensioned annular clearance space between the male and female members, each conditioning element defining longitudinally at least one inlet melt channel which is longitudinally substantially blocked at its downstream end and at least one outlet melt channel which is longitudinally substantially blocked at its upstream end, and said inlet and outlet melt channels are maintained in fluid communication through said precisely dimensioned clearance space defining a constrictive land interposed therebetween, such that melt transferring between said inlet and outlet melt channels must pass over said constrictive land and, furthermore, said melt transferring therebetween must undergo substantial angular change in flow direction as said inlet and outlet melt channels are not coaxially aligned, and each melt conditioning element feeding the melt directly into the gate;

(c) shearing substantially the melt as it flows during the intermittent pressurization of each cycle, within said melt conditioning elements, thereby increasing the melt temperature and mixing the melt by angular flow direction change as the melt is transferred through said constrictive land within said melt conditioning elements; and (d) heating at least one of said male and female members of each melt conditioning element comprising heating said melt conditioning elements to a temperature greater than a temperature of the melt measured upstream of the melt conditioning elements and forcing intimate contact between the melt and said heated members at least during the intermittent pressurization, thereby increasing heat transfer between said melt and said heated members and increasing melt temperature downstream of said melt conditioning elements whereby the melt entering each mold cavity has substantially greater homogeneity, fluidity, and heat content with very minimally increased heat history;

(e) injecting the melt into variable-volume multiple cavities positioned in the multicavity moldset, wherein each variable-volume cavity will be in a pre-enlarged state at the time when injection fill and melt pressurization first commences, so that there is minimal back pressure opposing the incoming melt caused by an aspect ratio of the final mold cavity volume as perceived by the incoming melt, since the overall cavity volume of said pre-enlarged cavity when being filled exceeds the melt's volume and is thereby not constrictive, such that a minimally oriented melt has been delivered into the pre-enlarged mold cavity and the melt is then subject to compressive redistribution and shrinkage compensation, into final part dimensions.

6. In a multiple gated single cavity injection molding process, a method for improving a thermoplastic's melt quality and increasing melt temperature entering a plurality of gates and thereby improving molded part quality, wherein said improvement is achieved by the method of:

(a) injecting a plasticated melt under pressure through a nozzle seated in a sprue bushing into a multigated moldset melt delivery system, said delivery system including melt passageways maintained continuously in fluid communication between the sprue bushing on an upstream end and runner bushings feeding into each gate cavity on a downstream end, the melt contained in the delivery system is intermittently pressurized and depressurized with each injection cycle, and the melt always retains sufficient fluidity to flow as required when next pressurized;

(b) displacing said melt contained in the delivery system downstream toward the gates feeding into the single mold cavity, upon each cycle's melt pressurization, the melt must pass through en route melt conditioning elements located upstream of each gate and downstream of each melt passageway, each conditioning element consisting of a male device member of generally torpedo shape housed concentrically within a generally cylindrically shaped female bushing member, a precisely dimensioned annular clearance space between the male and female members, each conditioning element defining longitudinally at least one inlet melt channel which is longitudinally substantially blocked at its downstream end and at least one outlet melt channel which is longitudinally substantially blocked at its upstream end, and said inlet and outlet melt channels are maintained in fluid communication through said precisely dimensioned clearance space defining a constrictive land interposed therebetween, such that melt transferring between said inlet and outlet melt channels must pass over said constrictive land and, furthermore, said melt transferring therebetween must undergo substantial angular change in flow direction as said inlet and outlet melt channels are not coaxially aligned, and each melt conditioning element feeding the melt directly into the gate;

(c) shearing substantially the melt as it flows during the intermittent pressurization of each cycle, within said melt conditioning elements, thereby increasing the melt temperature and mixing the melt by angular flow direction change as the melt is transferred through said constrictive land within said melt conditioning elements; and (d) heating at least one of said male and female members of each melt conditioning element comprising heating said melt conditioning elements to a temperature greater than a temperature of the melt measured upstream of the melt conditioning elements and forcing intimate contact between the melt and said heated members at least during the intermittent pressurization, thereby increasing heat transfer between said melt and said heated members and increasing melt temperature downstream of said melt conditioning elements whereby the melt entering each gate of the single cavity has substantially greater homogeneity, fluidity, and heat content with very minimally increased heat history.

7. A method of claim 6 wherein the single mold cavity is a single variable-volume mold cavity and said single variable-volume cavity is in a pre-enlarged state at the time when injection fill and melt pressurization first commences, so that there is minimal back pressure opposing the incoming melt by an aspect ratio of the final mold cavity volume as perceived by the incoming melt.

* * * * *